Patented Mar. 22, 1932

1,850,758

UNITED STATES PATENT OFFICE

HERBERT AUGUST LUBS AND ARTHUR LAWRENCE FOX, OF WILMINGTON, DELAWARE, ASSIGNORS TO E. I. DU PONT DE NEMOURS & COMPANY, OF WILMINGTON, DELAWARE, A CORPORATION OF DELAWARE

VIOLET VAT DYESTUFFS

No Drawing.    Application filed December 10, 1930.   Serial No. 501,465.

This invention relates to new vat dyes and more particularly the dyes resulting from the condensation of certain thionaphthenes with certain isatin halides.

Hoffa and Heyna (U. S. Patent 1,762,817, June 10, 1930) have disclosed (Ex. IV) a compound of the probable formula

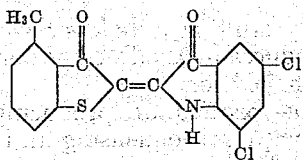

which is a violet vat dye of reddish shade.

It has now been found that shifting the methyl group from the "4" to the "5" position in the thionaphthene nucleus produces an unusual and unexpected blueing of the shade without adversely affecting the other properties of the dye. The above position numbers are based on the customary numbering scheme which is as follows:

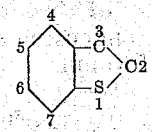

The production of new dyes, which inter alia is one object of this invention, is accomplished by condensing a 3-hydroxy-5-alkyl-thionaphthene represented by the formula

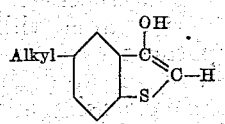

with a halo-isatin halide.

The invention will be readily understood from a consideration of the following example in which the parts are given by weight.

Example

In about 122 parts of chloro-benzene were placed 11 parts of 5:7-di-bromo-isatin

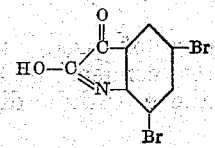

and 11 parts of phosphorus pentachloride and the mixture heated under refluxing conditions until solution was complete. To the resulting isatin chloride

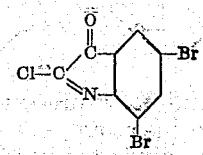

solution there was added 5.4 parts of a dry solution of 3-hydroxy-5-methyl-thionaphthene in about 66 parts of chloro-benzene. The dye formed at once and when the reaction was complete it was filtered off and washed with alcohol. It is a reddish violet powder which reduces in an alkaline hydrosulphite vat to a yellowish solution. It dyes cotton with desirable shades of bluish violet having good fastness.

The process and product are not limited to the 5:7-di-bromo-isatin of the above example. Other isatin compounds may be used, for instance the process of Example 1 may be carried out using 5.3 parts of isatin-chloride or 6.7 parts of 5-chloro-isatin-chloride. Desirable results are also obtained with proportionate quantities of 5:7-di-chloro-isatin-chloride.

While any halo-isatin-halide having the general formula

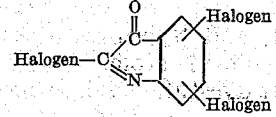

may be employed in the reactions above set out, preferably those compounds represented by the formula

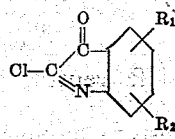

in which $R_1$ and $R_2$ represent hydrogen or a halogen atom, particularly bromine or chlorine are used.

In a similar manner other alkyl groups such as ethyl may replace the methyl of the 3-hydroxy-5-methyl-thionaphthene.

As many apparently widely different embodiments of this invention may made without departing from the spirit and scope thereof, it is to be understood that we do not limit ourselves to the specific embodiments thereof except as defined in the appended claims.

We claim:

1. The vat dyestuffs having the formula

[Structural formula: Alkyl-benzene-C(=O)-S-C=C-C(=O)-N(H)-benzene-R₁,R₂]

in which $R_1$ and $R_2$ represent hydrogen or a halogen atom.

2. The vat dyestuffs having the formula

[Structural formula similar to above]

in which $R_1$ and $R_2$ represent a hydrogen, bromine or chlorine atom.

3. The vat dyestuffs having the formula

[Structural formula]

in which $R_1$ and $R_2$ represent a bromine or chlorine atom.

4. The vat dyestuffs having the formula

[Structural formula with Halogen substituents]

5. The vat dyestuffs having the formula

[Structural formula]

in which $R_1$ and $R_2$ represent a hydrogen, bromine or chlorine atom.

6. The vat dyestuffs having the formula

[Structural formula]

in which $R_1$ and $R_2$ represent a bromine or chlorine atom.

7. The vat dyestuffs having the formula

[Structural formula with Halogen substituents]

8. The vat dyestuffs having the formula

[Structural formula with $CH_3$ and Halogen substituents]

9. The vat dyestuffs having the formula

[Structural formula with Alkyl and Br substituents]

10. The vat dyestuff having the formula

[Structural formula with $CH_3$ and Br substituents]

which dyestuff is a reddish violet powder which reduces in alkaline hydrosulphite to a yellowish solution.

11. The process of producing vat dyes which comprises condensing an isatin-halide of the probable formula

[Structural formula: Halogen-C=N, with R₁, R₂]

in which $R_1$ and $R_2$ represent hydrogen or a halogen atom with 3-hydroxy-5-alkyl-thionaphthene.

12. The process of producing vat dyes which comprises condensing an isatin-halide of the probable formula

[Structural formula]

in which $R_1$ and $R_2$ represent a hydrogen, bromine or chlorine atom with 3-hydroxy-5-alkyl-thionaphthene.

13. The process of producing vat dyes which comprises condensing an isatin-halide of the probable formula

[Structural formula: Chlorine-C=N, with R₁, R₂]

in which $R_1$ and $R_2$ represent hydrogen or a halogen atom with 3-hydroxy-5-alkyl-thionaphthene.

14. The process of producing vat dyes which comprises condensing 3-hydroxy-5-alkyl-thionaphthene with a di-halo-isatin-halide.

15. The process of producing vat dyes which comprises condensing 3-hydroxy-5-alkyl-thionaphthene with a di-bromo-isatin-chloride.

In testimony whereof we affix our signatures.

HERBERT A. LUBS.
ARTHUR L. FOX.